(12) United States Patent
Takazoe (10) Patent No.: US 9,154,406 B2
(45) Date of Patent: Oct. 6, 2015

(54) COMMUNICATION SYSTEM, WIRELESS DEVICE, AND PROGRAM FOR WIRELESS DEVICE

(75) Inventor: Tomoki Takazoe, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 14/125,510

(22) PCT Filed: Apr. 25, 2012

(86) PCT No.: PCT/JP2012/061103
§ 371 (c)(1),
(2), (4) Date: Dec. 11, 2013

(87) PCT Pub. No.: WO2012/176550
PCT Pub. Date: Dec. 27, 2012

(65) Prior Publication Data
US 2014/0112144 A1    Apr. 24, 2014

(30) Foreign Application Priority Data
Jun. 22, 2011   (JP) .................................. 2011-137957

(51) Int. Cl.
H04L 12/733   (2013.01)
H04W 40/24    (2009.01)
H04W 28/02    (2009.01)

(52) U.S. Cl.
CPC ........... *H04L 45/20* (2013.01); *H04W 28/0231* (2013.01); *H04W 40/248* (2013.01)

(58) Field of Classification Search
USPC ............ 370/52, 528, 529, 530, 531, 537, 546
See application file for complete search history.

(56) References Cited

U.S. PATENT DOCUMENTS

2003/0151513 A1   8/2003   Herrmann et al.
2003/0152041 A1   8/2003   Herrmann et al.

FOREIGN PATENT DOCUMENTS

| JP | 2004-120171 A | 4/2004 |
| JP | 2005-515695 A | 5/2005 |
| JP | 2009-033642 A | 2/2009 |

OTHER PUBLICATIONS

International Search Report for corresponding International Application No. PCT/JP2012/061103 mailed May 22, 2012.
Form PCT/ISA/237 for corresponding International Application No. PCT/JP2012/061103 dated May 22, 2012.
G. Montenegro, et al., "Transmission of IPv6 Packets over IEEE 802.15.4 Networks", Network Working Group, Microsoft Corporation, Request for Comments: 4944, Category: Standards Track, Sep. 2007.

*Primary Examiner* — Alvin Zhu
*Assistant Examiner* — Bo Hui A. Zhu
(74) *Attorney, Agent, or Firm* — Renner, Otto, Boisselle & Sklar, LLP (57) ABSTRACT

An edge router 12 sends a router advertisement to wireless terminals 11 to notify the wireless terminals 11 of the hop limit. Each wireless terminals 11 stores the notified hop limit in the hop limit field of an IPv6 packet. The edge router 12 stores the maximum number of hops in the user's home system 1 and the maximum number of hops in the IP network NW. When receiving a communication packet sent from the user's home system 1 to the IP network NW, the edge router 12 sets the hop limit in the communication packet to the maximum number of hops in the IP network NW. When receiving a communication packet sent from the IP network NW to the user's home system 1, the edge router 12 sets the hop limit in the communication packet to the maximum number of hops in the user's home system 1.

8 Claims, 6 Drawing Sheets

COMMUNICATION SYSTEM, WIRELESS DEVICE, AND PROGRAM FOR WIRELESS DEVICE

TECHNICAL FIELD

The present invention relates to a communication system, a wireless device, and a program for the wireless device.

BACKGROUND ART

The following non-patent literature 1, which is the standards of IPv6 over Low-power Wireless Personal Area Networks (6LoWPAN), is conventionally known. 6LoWPAN allows IPv6 to be available on IEEE 802.15.4. In 6LoWPAN, wireless devices performing communication over IPv6 in a low-power consumption wireless link do not include enough internal resources, and in some cases, it takes 20 to 30 msec to transmit a ping packet in the same link, for example. High resource devices such as PCs can transmit a ping packet in the order of milliseconds or less.

CITATION LIST

Patent Literature

[PTL 1] RFC 4944 Transmission of IPv6 Packets over IEEE 802.15.4 Networks

SUMMARY OF INVENTION

A wireless terminal in 6LowPAN includes a function of multi-hop routing. The wireless terminal is thereby connected to the Internet for communication through an edge router corresponding to a route node via plural wireless terminals.

However, in the communication by multi-hop routing using low-performance wireless terminals having insufficient internal resources as described above, the operation times at the wireless terminals are integrated into a large value, thereby causing a large delay in communication.

The present invention was proposed in the light of the aforementioned actual circumstances, and an object of the present invention is to provide a communication system, a wireless device, and a program for the wireless device which can prevent the delay in communication caused in the case of using low-performance wireless terminals.

A communication system according to a first aspect is a communication system including: a first wireless device provided between a first network and a second network; and a second wireless device which is provided for the first network and is wirelessly connected to the first wireless device. In the communication system, the first wireless device includes: a storage unit configured to store the maximum number of hops in the first network and the maximum number of hops in the second network; and a first communication unit configured to send a router advertisement to the second wireless device with a hop limit set to the maximum number of hops in the first network. The second wireless device includes: a hop limit setter configured to, when the second wireless device receives the hop limit included in the router advertisement sent from the first wireless device, set a hop limit to the received hop limit; a communication packet generator configured to generate a communication packet including the set hop limit; and a second communication unit configured to send the communication packet. The first wireless device further includes a hop limit rewriter configured to, when the first wireless device receives the communication packet sent from the first network to the second network, set the hop limit in the received communication packet to the maximum number of hops in the second network and, when the first wireless device receives a communication packet transmitted from the second network to the first network, set a hop limit in the received communication packet to the maximum number of hops in the first network. Moreover, the first communication unit forwards the communication packets with the hop limit set by the hop limit rewriter.

In a second aspect of the communication system according to the first aspect, the second wireless device includes a route generator configured to acquire the number of hops from other second wireless devices adjacent thereto to the first wireless device in the first network and generate a route so that the number of hops from the wireless device to the first wireless device does not exceed the hop limit set by the hop limit setter.

In a third aspect of the communication system according to the second aspect, when the route generator cannot generate a route with the number of hops within the hop limit set by the hop limit setter, the second wireless device informs the outside that a route with the number of hops within the hop limit set by the hop limit setter cannot be generated.

In a fourth aspect of the communication system according to the second aspect, when the route generator of the second wireless device generates a plurality of routes between the first wireless device and second wireless device, the route generator measures response times of the first wireless device via the plurality of routes to select one of the routes based on the measured response times.

In a fifth aspect of the communication system according to the forth aspect, when the difference in response time via the plurality of routes is not more than a predetermined value, the route generator of the second wireless device selects one of the plurality of routes based on the strength of received radio waves.

In a sixth aspect of the communication system according to the first aspect, the first wireless device further includes: a response time measurement unit configured to measure an average response time of other second wireless devices adjacent thereto in the first network; and a routing unit configured to generate a route using only routes in which the product of the number of hops and the average response time measured by the response time measurement unit is less than a communication time previously determined.

A wireless device according to a seventh aspect is a wireless device which is provided between first and second networks and is wirelessly connected to a wireless terminal provided in the first network, the wireless device including: a storage unit configured to store the maximum number of hops in the first network and the maximum number of hops in the second network; a communication unit configured to send a router advertisement to the wireless terminal with a hop limit set to the maximum number of hops in the first network; and a hop limit rewriter configured to, when the wireless device receives a communication packet transmitted from the first network to the second network, set the hop limit in the communication packet to the maximum number of hops in the second network, and when the wireless device receives a communication packet sent from the second network to the first network, set the hop limit in the communication packet to the maximum number of hops in the first network. Moreover, the communication unit forwards the communication packets with the hop limit set by the hop limit rewriter.

A program of a wireless device according to an eighth aspect is a program of a wireless device which is provided between first and second networks and is wirelessly connected to a wireless terminal provided in the first network, the program causing a computer of the wireless device to function as: a storage unit configured to store the maximum number of hops in the first network and the maximum number of hops in the second network; a communication unit configured to send a router advertisement to the wireless terminal with a hop limit set to the maximum number of hops in the first network; and a hop limit rewriter configured to, when the wireless device receives a communication packet transmitted from the first network to the second network, set the hop limit in the communication packet to the maximum number of hops in the second network, and when the wireless device receives a communication packet sent from the second network to the first network, set the hop limit in the communication packet to the maximum number of hops in the first network. The program further causes the communication unit to function to forward the communication packets with the hop limit set by the hop limit rewriter.

A wireless device according to a ninth aspect is a wireless device which is wirelessly connected to a wireless base apparatus provided between first and second networks and is provided in the first network, the wireless device including: a hop limit setter configured to, when the wireless device receives a hop limit included in a router advertisement sent from the wireless base apparatus, set the received hop limit; a communication packet generator configured to generate a communication packet including the hop limit set by the hop limit setter; and a communication unit configured to send the communication packet. Moreover, the wireless device further includes a route generator configured to acquire the number of hops from other wireless devices adjacent thereto to the wireless base apparatus in the first network and generates a route so that the number of hops from the wireless device itself and the wireless base apparatus does not exceed the hop limit set by the hop limit setter.

A program of a wireless device according to a tenth aspect is a program of a wireless device which is wirelessly connected to a wireless base apparatus provided between first and second networks and is provided in the first network, the program causing a computer of the wireless base apparatus to function as: a hop limit setter configured to, when the wireless device receives a hop limit included in a router advertisement sent from the wireless base apparatus, set the received hop limit; a communication packet generator configured to generate a communication packet including the hop limit set by the hop limit setter; and a route generator configured to acquire the number of hops from other wireless devices adjacent thereto to the wireless base apparatus in the first network and generates a route so that the number of hops from the wireless device itself and the wireless base apparatus does not exceed the hop limit set by the hop limit setter.

According to the aforementioned aspects, a router advertisement including a hop limit set to the maximum number of hops in the wireless communication network is sent to the wireless device, and the sent hop limit is set as a hop limit of the wireless device. This can reduce the delay in communication caused in the case of using low-performance wireless devices.

DESCRIPTION OF EMBODIMENTS

Figure 1:
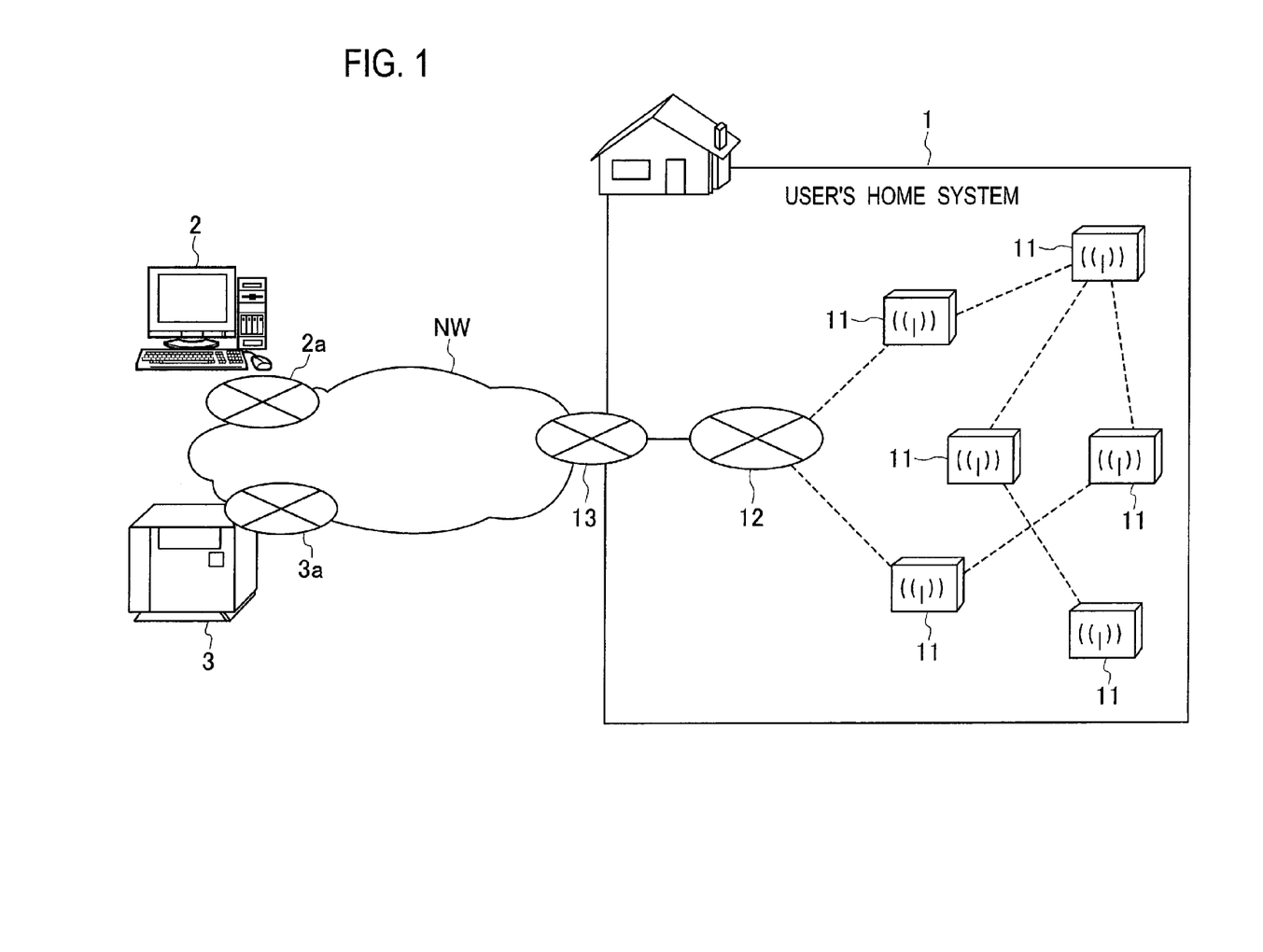
FIG. 1 is a block diagram illustrating a configuration example of a communication system shown as an embodiment of the present invention.

A communication system shown as an embodiment of the present invention is configured as illustrated in FIG. 1, for example. In the communication system, a user's home system 1 communicates with a personal computer 2 or an external server 3 through an IP network NW and routers 2a and 3a. The user's home system 1 constitutes a wireless communication network as a first network capable of performing IP communication. On the other hand, the IP network NW constitutes a wire or a wireless communication network as a second network capable of performing IP communication. In this communication system, wireless terminals 11 and an edge router 12 in the wireless communication system and the personal computer 2 and external server 3 in the IP network NW can communicate over IPv6.

In this communication system, in response to a request generated by the personal computer 2 operated by a user, for example, the user's home system 1 notifies the personal computer 2 of the conditions in the user's home and the like. Moreover, the communication system supplies the external server 3 with sensor information detected by the wireless terminals 11 in order to monitor the inside of the user's home through the external server 3, for example.

The user's home system 1 includes the plural wireless terminals 11 as second wireless devices (wireless adaptors), the edge router 12 as a first wireless device (a wireless base unit), and a broadband router 13. The edge router 12 functions as a base unit for the wireless terminals 11.

Each wireless terminal 11 sends and receives wireless signals to and from the edge router 12 or other wireless terminals 11. The wireless terminals 11 are sensors, switches, and the like provided in the user's home. Examples of the wireless terminals 11 include various types of sensors such as a temperature sensor, various types of switches such as a lighting switch, various home appliances such as a light and an air conditioner. The wireless terminals 11 are configured to output sensor signals and data including an on/off state as wireless signals in order to allow the user to browse the conditions inside the user's home. The outputted wireless signals are directly sent to the edge router 12 or sent to the edge router 12 via other wireless terminals 11 in a multi-hop manner.

Each wireless terminal 11 performs a process of setting a hop limit through a router advertisement, a process of calculating a route based on the hop limit, and the like as described later. The wireless terminals 11 are each composed of a computer including at least a storage, a communication I/F circuit, a CPU, and a program, and the CPU executes the program. The program of the wireless terminals 11 causes the computer to execute the operation of setting the hop limit through a router advertisement and the operation of calculating a route.

The edge router 12 sends and receives wireless signals to and from the wireless terminals 11. The edge router 12 sends wireless signals in response to a sending request from the broadband router 13 and receives wireless signals from the wireless terminals 11 to supply data to the broadband data 13. As described later, the edge router 12 performs an operation of setting the hop limit of each wireless terminal 11, an operation of rewriting the hop limit of a packet, and an operation of calculating a route to the wireless terminals 11.

The edge router 12 is a computer including at least a storage, a communication I/F, a CPU, and a program, and the CPU executes the program. The program of the edge router 12 causes the computer to execute the operation of sending a router advertisement, the operation of rewriting the hop limit, and the operation of calculating a route to a wireless terminal 11 as described above.

The broadband router 13 is a first wireless device provided between the user's home system 1 as the first network and the IP network NW as the second network. The broadband router 13 sends a wireless signal to the wireless terminals 11 through the edge router 12 in response to a request from the personal computer 2 or external server 3. Moreover, the broadband router 13 sends data received from the wireless terminals 11 via the edge router 12 to the personal computer 2 or external server 3.

Figure 2:
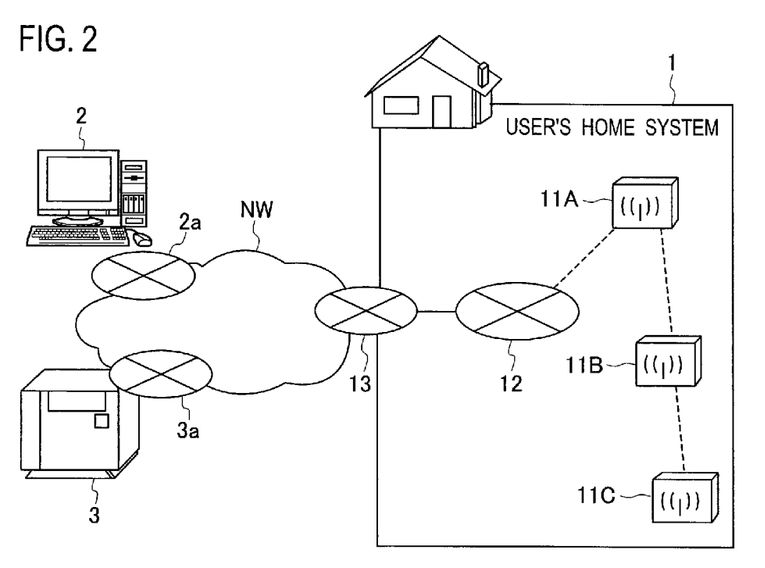
FIG. 2 is a block diagram illustrating a route within a user's house system of the communication system shown as the embodiment of the present invention.

In the communication system as described above, each wireless terminal 11 can communicate with the edge router 12 via some of the other wireless terminals 11 when the wireless terminal 11 cannot directly communicate with the edge router 12. Such a mechanism is generally referred to as multi-hop. For example, as illustrated in FIG. 2, in order for the wireless terminal 11C to communicate with the edge router 12, it is necessary to perform multi-hop communication via wireless terminals 11B and 11A.

In the case where the wireless terminals 11 perform multi-hop communication, the wireless terminals 11, which generally have an information processing capability lower than personal computers and the like, require a long period of time to forward a packet in many cases. For example, while a personal computer can send a ping packet to and receive a replay from another personal computer directly connected thereto by wire within 1 msec, the wireless terminals 11 require a communication time of 20 msec or more. Accordingly, in the case where the communication time is limited in multi-hop communication of the wireless terminals 11, it is required to limit the number of hops at multi-hop communication in a wireless communication network.

Figure 3:
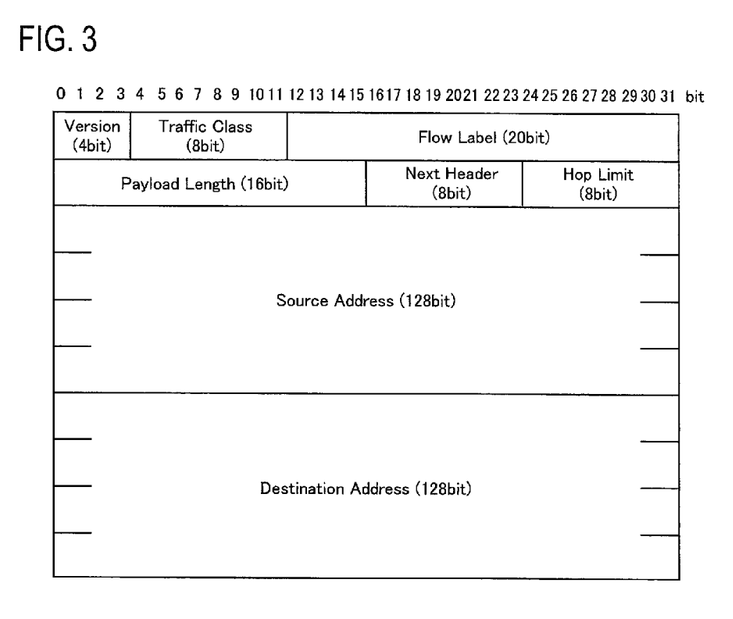
FIG. 3 is a diagram showing a header format of an IPv6 packet.

In this communication system, therefore, the hop limit of the wireless terminals 11 is set by the edge router 12 in the user's home system 1. The area storing the hop limit is provided in the header of an IPv6 packet as shown in FIG. 3. When the hop limit is set, each wireless terminal 11 stores the value of the hop limit in a hop limit field of each IPv6 packet generated after the setting.

The edge router 12 stores the maximum number of hops in the wireless communication network of the user's home system 1 and the maximum number of hops in the IP network NW. The edge router 12 sends a router advertisement to the wireless terminals 11 with the hop limit set to the maximum number of hops in the wireless communication network.

On the other hand, when receiving the hop limit included in the router advertisement sent from the edge router 12, each wireless terminal 11 sets a hop limit to the received hop limit (a hop limit setter). Thereafter, the wireless terminal 11 generates a communication packet including the set hop limit (a communication packet creating portion). The wireless terminal 11 sends the communication packet as a wireless signal.

In this communication system, when receiving a communication packet sent from the wireless communication network to the IP network NW, the edge router 12 rewrites the hop limit in the communication packet to the maximum number of hops in the IP network NW. On the other hand, when receiving a communication packet sent from the IP network NW to the wireless communication network, the edge router 12 rewrites the hop limit in the communication packet to the maximum number of hops in the wireless communication network. The edge router 12 forwards the rewritten communication packet.

Figure 4:
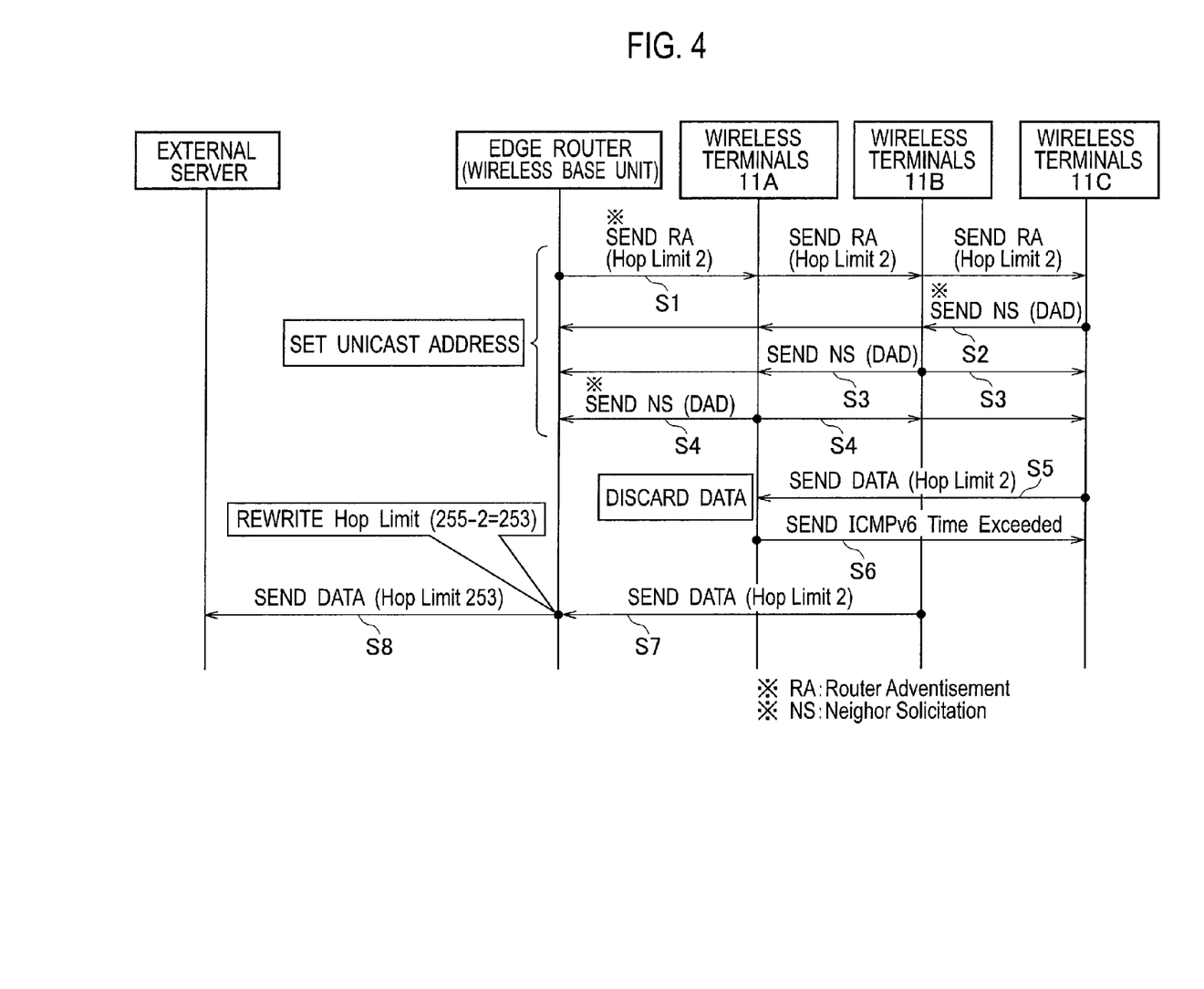
FIG. 4 is a sequence chart illustrating transmission and reception of signals by each portion in the communication system shown as the embodiment of the present invention.

In this communication system, the edge router 12 and wireless terminals 11A to 11C operate as shown in FIG. 4.

The edge router 12 periodically sends a message (a router advertisement message) S1 called a router advertisement (RA). The router advertisement message S1 is mainly used to send a 64-bit network prefix to the wireless terminals 11A to 11C on the same network. The router advertisement message S1 can be used to also send various types of information as options to the wireless terminals 11A to 11C in addition to the network prefix. The edge router 12 in this embodiment therefore notifies the wireless terminals 11A to 11C of the limit of the number of terminals (hop limit) through which a same packet is allowed to goes.

The hop limit is set in order to avoid a route through which it takes a long time to communicate between the edge router 12 and the wireless terminal 11 when an administrator who manages the wireless communication network of the user's home system 1 wants to limit the number of wireless terminals 11 through which a same packet goes. Specifically, in the communication system illustrated in FIG. 2, the hop limit is set to 2 as shown in FIG. 4. The router advertisement message S1 is supplied to the wireless terminal 11C via the wireless terminals 11A and 11B. Each wireless terminal 11 is configured to store the hop limit included in the router advertisement message S1 into a communication packet when receiving the router advertisement message S1.

Moreover, in this communication system, the wireless terminals 11 cannot receive the router advertisement message S1 when being not in operation. Each wireless terminal 11 therefore sends a router solicitation (RS) message through multicast when started. The router solicitation message is received by the edge router 12 directly or via the adjacent wireless terminals 11.

The edge router 12 which has received the router solicitation message can send the router advertisement message S1 to the same wireless terminal 11. Each wireless terminal 11 which has received the router advertisement message S1 combines a data link layer address (a MAC address or the like) and the received network prefix included in the router advertisement message S1 to determine a 128-bit IPv6 address. Thereafter, the wireless terminal 11 confirms whether the determined IPv6 address is the same as that of another wireless terminal. The wireless terminals 11 execute a method called duplication address detection (DAD). The wireless terminals 11A to 11C send neighbor solicitation (NS) messages S2, S3, and S4 with the destination addresses set to the determined IPv6 address. The wireless terminals 11A to 11C set the IPv6 addresses of themselves to the determined IPv6 addresses if not receiving a reply to the NS message S2 within a certain period of time.

In the aforementioned manner, the wireless terminals 11A to 11C set the IPv6 addresses and hop limits based on the router advertisement message S1 from the edge router 12. The wireless terminals 11A to 11C send data to the external server 3 if necessary.

Herein, it is assumed that the route is set so that the wireless terminal 11C sends data to the external server 3 via the wireless terminal 11B, wireless terminal 11A, and edge router 12 in this order as illustrated in FIG. 2. In this case, at the time of sending data to the external server 3, the wireless terminal 11C sends a communication packet S5 to the wireless terminal 11B with the hop limit set to 2. When receiving the communication packet S5, the wireless terminal 11B sets the hop limit to a value obtained by decrementing the received hop limit by 1, that is, 1 and then forwards the communication packet S5 to the wireless terminal 11A. When receiving the communication packet S5, the wireless terminal 11A decrements the hop limit by 1. The hop limit then becomes 0. The wireless terminal 11A cannot forward the communication packet to the edge router 12 and discards the same.

The wireless terminal 11A then sends a time exceeded message S6 prescribed by ICMPv6 to the wireless terminal 11B. When receiving the time exceeded message S6, the wireless terminal 11B forwards the received time exceeded message S6 to the wireless terminal 11C. When receiving the time exceeded message S6, the wireless terminal 11C knows that the communication packet S5 sent by the wireless terminal 11C before is discarded.

Also in the case where the wireless terminal 11B sends data to the external server 3, the wireless terminal 11B sends a communication packet S7 to the wireless terminal 11A with the hop limit set to 2. When receiving the communication packet S7, the wireless terminal 11A sets the hop limit to a value obtained by decrementing the hop limit by 1, that is, 1 and then forwards the communication packet S7 to the edge router 12.

When receiving the communication packet S7, the edge router 12 determines that the data can be forwarded to the external server 3 because the hop limit is 1. The edge router 12 generates a communication packet S8 with the hop limit set to 253, which is obtained by subtracting 2 as the number of hop in the wireless communication network from 255 as the maximum hop limit (a referential value) of the IP network NW that is previously set by an administrator. When receiving a communication packet which is sent from the wireless communication network to the IP network NW, the edge router 12 rewrites the hop limit included in the communication packet to the maximum number of hops in the IP network NW. The edge router 12 then forwards the communication packet S8 addressed to the external server 3 via the broadband router 13.

In the description of the aforementioned operation example, data is sent from the user's home system 1 to the external server 3. On the other hand, in the case of sending a request or the like from the external server 3 to the wireless terminals 11, the edge router 12 needs to rewrite the maximum number of hops of the IP network NW to the maximum number of hops of the wireless communication network.

As described above, according to the communication system, the router advertisement including a hop limit set to the maximum number of hops in the wireless communication network is sent to the wireless devices 11, and the sent hop limit is set as the hop limit of the wireless devices 11A to 11C. In this communication system, it is therefore possible to reduce a delay in communication caused in the case of using low-power wireless terminals 11.

Moreover, according to this communication system, the edge router 12 exchanges the maximum number of hops in the IP network NW and the maximum number of hops in the wireless communication network. Accordingly, there is no influence on the number of hops in the IP network NW.

To be specific, the wireless communication system of the user's home system 1 often includes low-performance wireless terminals 11 and provide long response time. Accordingly, it is preferable to reduce the number of hops. On the other hand, the IP network NW outside of the home, such as the Internet does not include any particular restriction by terminals. Accordingly it is preferable to use the value (255) normally used. According to this communication system, it is possible to set both the numbers of hops in the wireless network and IP network NW only in the IPv6 layer without regard to control of the number of hops.

Furthermore, according to this communication system, the wireless terminals 11 can communicate with the external server 3 with the number of hops limited in the wireless communication network through the function of the IPv6 layer independently of applications which can be implemented in the communication system. Moreover, according to this communication system, it is possible to easily set the number of hops between each wireless terminal 11 and the edge router 12 as a route node without influencing the number of hops in the communication section of the Internet other than the wireless communication section.

Next, a description is given of creation of a route to the edge router 12 by the wireless terminals 11 in the aforementioned communication system. Each wireless terminal 11 acquires the numbers of hops between other wireless terminals 11 adjacent thereto and the edge router 12 in the wireless communication network and generates a route so that the number of hops from itself to the edge router 12 does not exceed the hop limit. The communication system can therefore prevent formation of a route with a number of hops exceeding the hop limit, thus reducing unnecessary communication.

Figure 5:
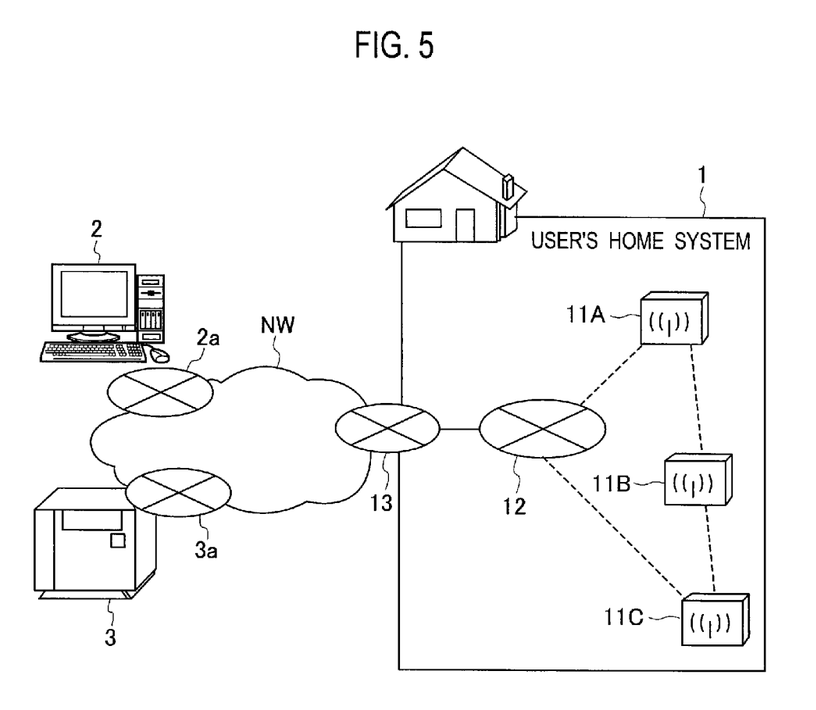
FIG. 5 is a block diagram showing the presence of plural routes in the communication system shown as the embodiment of the present invention.

In the wireless communication system illustrated in FIG. 2, for example, there are plural routes from the wireless terminal 11C to the edge router 12, and it is possible to select one out of the plural routes. FIG. 5 shows a route via the wireless terminals 11B and 11A (indicated by a dotted line) and a route directly connected to the edge router 12 (indicated by a solid line).

In the case where there are plural selectable routes as described above, the wireless terminal 11 generates a route so that the number of hops to the edge router 12 does not exceed the hop limit prescribed in the router advertisement sent from the edge router 12. When there are plural routes with the number of hops not exceeding the hop limit, the wireless terminal 11 selects one out of the plural routes based on the response times of the other wireless terminals 11 or the strength of received radio waves.

Figure 6:
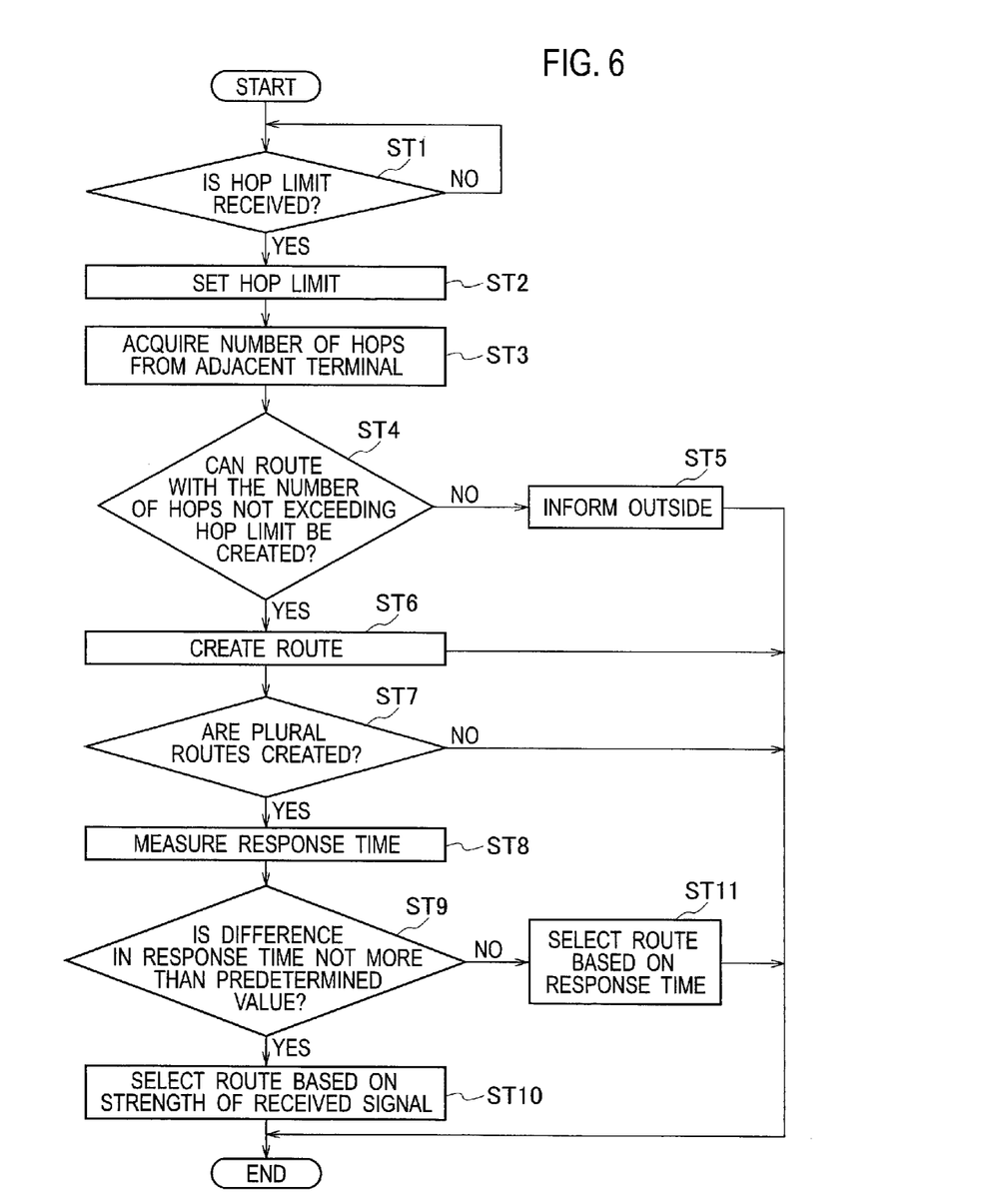
FIG. 6 is a flowchart showing a procedure for calculating a route by wireless terminals in the communication system shown as the embodiment of the present invention.

Each wireless terminal 11 operates according to the procedure illustrated in FIG. 6, for example. A description is given of an example of the operation of the wireless terminal 11C in FIG. 5, for example.

When the wireless terminal 11C first determines that the hop limit has been received through the router advertisement from the edge router 12 in step ST1, the wireless terminal 11C sets the hop limit in step ST2. In this example, the hop limit is 2.

In next step ST3, the wireless terminal 11C sends through multicast to the adjacent wireless terminals 11 and edge router 12, a message requesting the number of hops to the edge router 12. When the edge router 12 receives the message requesting the number of hops, the edge router 12 can directly communicate with the wireless terminal 11 without going through another wireless terminal 11. Accordingly, the edge router 12 replies 1 as the number of hops. On the other hand, when the wireless terminal 11B receives the message requesting the number of hops through the multicast from the wireless terminal 11C, the wireless terminal 11B replies 3 as the number of hops because the wireless terminal 11B is connected to the edge router 12 via the wireless terminal 11A.

In next step ST4, the wireless terminal 11C determines whether a route with the number of hops not exceeding the hop limit can be generated. The wireless terminal 11C compares 2 as the hop limit with the number of hops obtained in the step ST3. The wireless terminal 11C determines that the route via the wireless terminal 11B has a number of hops of 3, which exceeds 2 as the hop limit. On the other hand, the number of hops received from the edge router 12 is 1, and the wireless terminal 11C therefore determines that the number of hops from the edge router 12 does not exceed 2 as the hop limit and proceeds to step ST6.

If the wireless terminal 11C does not acquire the number of hops from the edge router 12, the wireless terminal 11C proceeds to the step ST5 since the number of hops received from the wireless terminal 11B exceeds the hop limit. In the step ST5, the wireless terminal 11C informs the outside that the wireless terminal 11C cannot generate a route with the number of hops not exceeding the hop limit and terminates the process. The informing is performed by sending a mail to a mobile terminal of the administrator, displaying the fact on GUI of the wireless terminal 11C, or another way.

Alternatively, the wireless terminal 11C may inform the outside that the wireless terminal 11C cannot generate a route with the number of hops not exceeding the hop limit and eliminates the route via the wireless terminal 11B at the route setting. This allows the administrator to take measures to increase the number of routes with the number of hops not exceeding the hop limit, such as changing the places where the wireless terminals 11 are installed or increasing the strength of transmitted radio waves. Moreover, if the wireless terminals are provided with GUI or the like, it is possible to display route setting information on the GUI to notify the administrator.

In the step ST6, the wireless terminal 11C generates a route with the number of hops not exceeding the hop limit. The wireless terminal 11C generates a route through which wireless signal is directly transmitted to the edge router 12.

In next step ST7, the wireless terminal 11C determines whether plural routes with the number of hops not exceeding the hop limit are generated in the step ST6. The wireless terminal 11C then terminates the process because only the route through which wireless signal is directly transmitted to the edge router 12 is generated.

If plural routes with the number of hops not exceeding the hop limit are generated in the step ST6, the wireless terminal 11C proceeds to step ST8. In the step ST8, the wireless terminal 11C measures the response time of the edge router 12 via each route.

In next step ST9, the wireless terminal 11 determines whether the difference in measured response time of the edge router 12 via each route is not less than a predetermined value. If the difference in response time of the edge router 12 via each route is not less than the predetermined value, the wireless terminal 11 proceeds to step ST10, and otherwise, the wireless terminal proceeds to step ST11.

In step ST11, the wireless terminal 11 selects a route through which the edge router 12 responds within a short response time and terminates the process. The wireless terminal 11C therefore performs route selection based on the response time of the edge router 12 to select a route having less delay time. Alternatively, when the routes are already constructed, the wireless terminal 11C sends a ping packet to each wireless terminal 11 to measure the actual response time, compares the measured response times, instead of the average response time, with an allowable response time previously set, and performs multi-hop through the routes with a response time within the allowable response time. It is therefore possible to construct a wireless communication network which can respond within a predetermined response time determined with a high accuracy.

In the step ST10, for the difference in measured response time of the edge router 12 via each route is not more than the predetermined value, the wireless terminal 11 selects a route based on the strength of received radio waves. In this process, the wireless terminal 11 selects a route including a wireless terminal or edge router 12 from which the wireless terminal 11C receives the strongest radio waves among the adjacent wireless terminals 11 and edge router 12. Accordingly, even if the response times by some routes are close to each other, the wireless terminal 11 can select a route providing more stable wireless communication.

Figure 7:
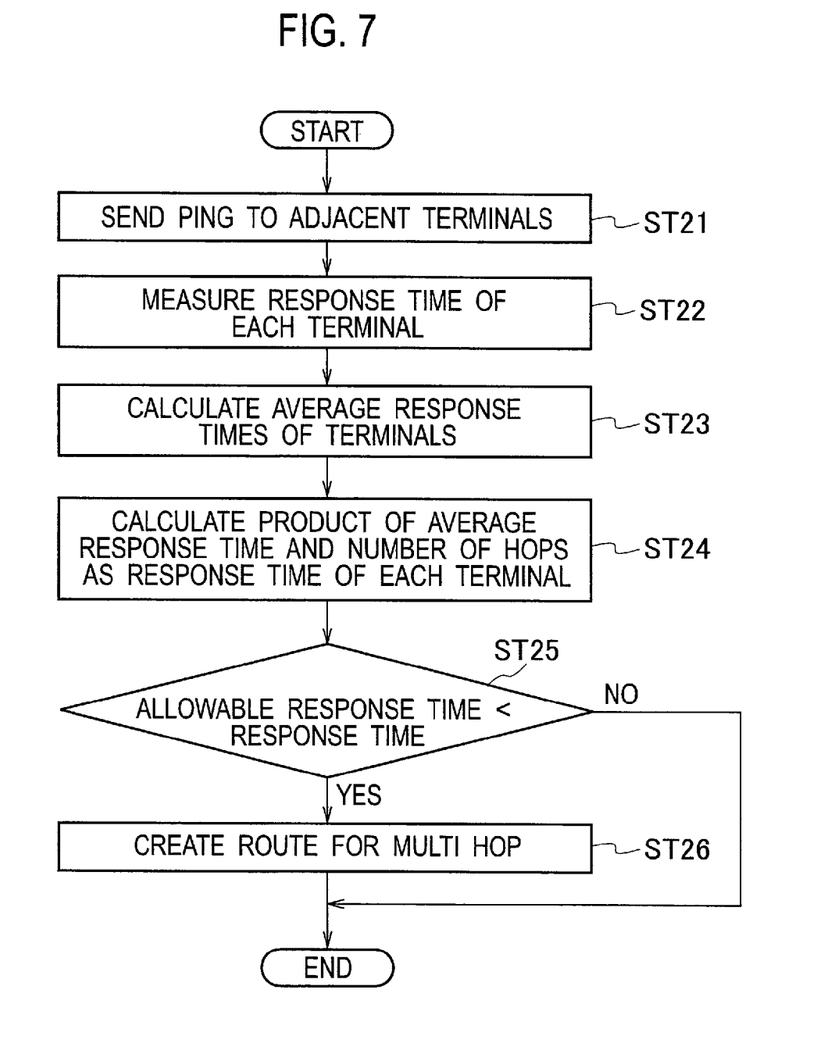
FIG. 7 is a flowchart showing a procedure for calculating a route by an edge router in the communication system shown as the embodiment of the present invention.

Next, a description is given of a process to calculate a route through which the edge router 12 transmits a request or data to the wireless terminals 11 in the aforementioned communication system with reference to FIG. 7.

In step ST21, first, the edge router 12 sends a ping packet to each adjacent wireless terminal 11.

In next step ST22, the edge router 12 measures the response time to receive a packet replying to the ping packet sent in the step ST21 for each wireless terminal 11.

In next step ST23, the edge router 12 calculates the average of all the response times measured for the wireless terminals 11 in the step ST22 to calculate the average response time of the wireless terminals 11 in the wireless communication network. The calculated average response time can be considered as a response time per hop in the wireless communication network.

In next step ST24, the edge router 12 calculates the product of the average response time obtained in the step ST23 and the number of hops to each wireless terminal 11 as a response time from the edge router 12 to each wireless terminal 11.

In next step ST25, the edge router 12 determines whether the response time calculated in the step ST24 between the edge router 12 and each wireless terminal 11 is shorter than the allowable response time previously set. If the response time from the edge router 12 to one of the wireless terminals 11 is shorter than the allowable response time, the edge router 12 proceeds to step ST26 and generates a route to the same wireless terminal 11. On the other hand, if the response time between the edge router 12 and one of the wireless terminals 11 is not shorter than the allowable response time, the edge router 12 discards the route to the same wireless terminal.

According to the above-described communication system, the edge router 12 generates a route with only routes in which the product of the average response time and the number of hops is shorter than the previously determined communication time and can construct a wireless communication network which responds within a limited communication time. In some applications, the response time is important in terms of control delay time and the like. However, according to the communication system of the present invention, it is possible to estimate the communication time based on the number of hops and the average response time of adjacent wireless terminals 11 and previously eliminate routes requiring long communication time.

When the user's home system 1 includes more wireless terminals 11, a wider variety of routes are generated between each wireless terminal and the edge router 12. However, it is possible to generate a route having less communication delay depending on the response time instead of the number of hops.

The aforementioned embodiment is an example of the present invention. Accordingly, the present invention is not limited to the above-described embodiment and, in addition to the aforementioned embodiment, it is certain that, the present invention can be variously changed according to the design or the like without departing from the technical scope according to the present invention.

INDUSTRIAL APPLICABILITY

The present invention is applicable to manufacturing fields of communication systems, wireless devices, and programs for wireless devices.

REFERENCE SIGNS LIST

1 USER'S HOME SYSTEM
2 PERSONAL COMPUTER
3 EXTERNAL SERVER
11 WIRELESS TERMINAL
12 EDGE ROUTER
13 BROADBAND ROUTER

The invention claimed is:

1. A communication system, comprising:
a first wireless device provided between a first network and a second network; and
a second wireless device which is provided for the first network and is wirelessly connected to the first wireless device, wherein
the first wireless device includes: a storage unit configured to store the maximum number of hops in the first network and the maximum number of hops in the second network; and a first communication unit configured to send a router advertisement to the second wireless device with a hop limit set to the maximum number of hops in the first network, and
the second wireless device includes: a hop limit setter configured to, when the second wireless device receives the hop limit included in the router advertisement sent from the first wireless device, set a hop limit to the received hop limit; a communication packet generator configured to generate a communication packet including the set hop limit; and a second communication unit configured to send the communication packet,
the first wireless device further includes a hop limit rewriter configured to, when the first wireless device receives the communication packet sent from the first network to the second network, set the hop limit in the received communication packet to the maximum number of hops in the second network and, when the first wireless device receives a communication packet transmitted from the second network to the first network, set a hop limit in the received communication packet to the maximum number of hops in the first network, and
the first communication unit forwards the communication packets with the hop limit set by the hop limit rewriter.

2. The communication system according to claim 1, wherein the second wireless device includes a route generator configured to acquire the numbers of hops from other second wireless devices adjacent thereto to the first wireless device in the first network and generate a route so that the number of hops from the second wireless device to the first wireless device does not exceed the hop limit set by the hop limit setter.

3. The communication system according to claim 2, wherein, when the route generator cannot generate a route with the number of hops within the hop limit set by the hop limit setter, the second wireless device informs the outside that the a route with the number of hops within the hop limit set by the hop limit setter cannot be generated.

4. The communication system according to claim 2, wherein, when the route generator of the second wireless device generates a plurality of routes between the first wireless device and second wireless device, the route generator measures response times of the first wireless device via the plurality of routes to select one of the routes based on the measured response times.

5. The communication system according to claim 4, wherein, when the difference in response time via the plurality of routes is not more than a predetermined value, the route generator of the second wireless device selects one of the plurality of routes based on the strength of received radio waves.

6. The communication system according to claim 1, wherein
the first wireless device further includes:
a response time measurement unit configured to measure an average response time of other second wireless devices adjacent thereto in the first network; and
a routing unit configured to generate a route using only routes in which the product of the number of hops and the average response time measured by the response time measurement unit is less than a communication time previously determined.

7. A wireless device which is provided between first and second networks and is wirelessly connected to a wireless terminal provided in the first network, the wireless device comprising:
a storage unit configured to store the maximum number of hops in the first network and the maximum number of hops in the second network;
a communication unit configured to send a router advertisement to the wireless terminal with a hop limit set to the maximum number of hops in the first network; and
a hop limit rewriter configured to, when the wireless device receives a communication packet transmitted from the first network to the second network, set the hop limit in the communication packet to the maximum number of hops in the second network, and when the wireless device receives a communication packet sent from the second network to the first network, set the hop limit in the communication packet to the maximum number of hops in the first network, wherein
the communication unit forwards the communication packets with the hop limit set by the hop limit rewriter.

8. A wireless device which is wirelessly connected to a wireless base apparatus provided between first and second networks and is provided in the first network, the wireless device comprising:
a hop limit setter configured to, when the wireless device receives a hop limit included in a router advertisement sent from the wireless base apparatus, set the received hop limit;
a communication packet generator configured to generate a communication packet including the hop limit set by the hop limit setter; and
a communication unit configured to send the communication packet; wherein
the wireless device further includes a route generator configured to acquire the number of hops from other wireless devices adjacent thereto to the wireless base apparatus in the first network and generates a route so that the number of hops from the wireless device itself and the wireless base apparatus does not exceed the hop limit set by the hop limit setter.

\* \* \* \* \*